United States Patent
Miyazaki et al.

[11] Patent Number: 5,996,230
[45] Date of Patent: *Dec. 7, 1999

[54] DOUBLE-ROW, BALL BEARING AND METHOD OF PRODUCING THE SAME

[75] Inventors: Seizo Miyazaki, Kawasaki; Daijiro Kitahara; Shiro Saito, both of Tokyo, all of Japan

[73] Assignee: NSK Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/767,779

[22] Filed: Dec. 17, 1996

Related U.S. Application Data

[62] Division of application No. 08/359,451, Dec. 19, 1994, Pat. No. 5,599,111.

[30] Foreign Application Priority Data

Dec. 17, 1993 [JP] Japan .................................. 5-318361

[51] Int. Cl.$^6$ .................................................. F16C 33/00
[52] U.S. Cl. .................................. 29/898.062; 29/898.09; 384/512; 384/513
[58] Field of Search ..................... 29/898.061, 898.062, 29/898.064, 898.07, 898.09; 384/512, 506, 513, 516, 501; 73/801

[56] References Cited

U.S. PATENT DOCUMENTS

| | | | |
|---|---|---|---|
| 3,986,754 | 10/1976 | Torrant | 384/512 |
| 4,713,704 | 12/1987 | Voll et al. | |
| 4,783,182 | 11/1988 | Caron et al. | 384/512 |
| 4,900,958 | 2/1990 | Kitahara et al. | |
| 5,045,738 | 9/1991 | Hishida et al. | |
| 5,138,209 | 8/1992 | Chuta et al. | |
| 5,341,569 | 8/1994 | Takamizawa et al. | |

FOREIGN PATENT DOCUMENTS

| | | |
|---|---|---|
| 50-101753 | 8/1975 | Japan . |
| 56-127456 | 9/1981 | Japan . |
| 57-140912 | 8/1982 | Japan . |
| 57-200722 | 12/1982 | Japan . |
| 60-196024 | 12/1985 | Japan . |
| 61-65913 | 4/1986 | Japan . |
| 61-79899 | 4/1986 | Japan . |
| 61-145761 | 7/1986 | Japan . |
| 62-22323 | 2/1987 | Japan . |
| 39-3916 | 2/1989 | Japan . |
| 3-36517 | 4/1991 | Japan . |
| 3-222661 | 10/1991 | Japan . |
| 61-65913 | 12/1996 | Japan . |
| 61-79899 | 12/1996 | Japan . |
| 216251 | 5/1924 | United Kingdom . |
| 233867 | 5/1925 | United Kingdom . |
| 344995 | 3/1931 | United Kingdom . |
| 470696 | 8/1937 | United Kingdom . |
| 708605 | 5/1954 | United Kingdom . |
| 2227529 | 8/1990 | United Kingdom . |

*Primary Examiner*—S. Thomas Hughes
*Assistant Examiner*—Marc W. Butler
*Attorney, Agent, or Firm*—Evenson, McKeown, Edwards & Lenahan, PLLC

[57] ABSTRACT

The double-row ball bearing having a stationary shaft, a rotatable outer ring and balls between them is set in an inspection apparatus, so that the acoustic sound produced as the outer ring is rotated with the shaft inserted inside the balls is detected by a vibration pickup device to examine for the flaws on the surfaces of balls, shaft and outer ring.

10 Claims, 12 Drawing Sheets

DOUBLE-ROW, BALL BEARING AND METHOD OF PRODUCING THE SAME

This is a divisional of application Ser. No. 08/359,451, filed Dec. 19, 1994 now U.S. Pat. No. 5,599,111.

FIELD OF THE INVENTION

The present invention relates to a double-row ball bearing adapted to be assembled in various precision rotary components, for example, spindle motors, rotary actuators, rotary encoders and the like for video tape recorders (VTR), hard disk drives (HDD) and laser beam printers (LBP) in order to rotatably support their rotating elements.

DESCRIPTION OF THE RELATED ART

A pair of mutually independent ball bearings (of either the deep groove type or the angular type) have heretofore been employed to rotatably support a spindle of VTR or HDD while preventing whirling (i.e., motions in a direction perpendicular to the spindle) and/or axial deviations. A double-row ball bearing has also been proposed to be use in order to make efficient the assembly of ball bearings in a rotatably supporting mechanism.

A double-row ball bearing is comprised of a spindle or shaft 2, which has a pair of inner raceways 1 of deep groove type in an outer peripheral face thereof as shown in FIG. 1(A), an outer ring or race 4, which has a pair of outer raceways 3 of deep groove type in an inner peripheral face thereof as depicted in FIG. 1(B), and a plurality of balls 5 rotatably provided between the inner raceways 1 and the corresponding outer raceways 3. The spindle or shaft 2 is concentrically combined with the outer ring or race 4 as illustrated in FIG. 1(C). There is a radial spacing 8 which extends in a circumferential direction between the outer raceway 3 and the inner raceway 1.

FIG. 1(C) also shows retainers 6 for holding the balls 5 at equal angular intervals and seals 7 for preventing dust and the like from penetrating into the ball-inserted parts.

Although the construction of such a double-row ball bearing as shown in FIG. 1(C) has been known, it has heretofore been difficult to manufacture a double-row ball bearing suitable for use in supporting a spindle in VTR or HDD. This can be attributed to the reasons to be described next.

A ball bearing for use in supporting a spindle in VTR or HDD is required to have extremely high accuracy in order to avoid whirling motions and axial displacements. Therefore, a ball bearing for use in supporting such a spindle is used in a state preloaded in an axial direction.

Upon insertion of the balls 5 between each inner raceway 1 and its corresponding outer raceway 3 to assemble the deep-groove ball bearing, on the other hand, the inner raceway 1 and the outer raceway 3 are brought into an eccentric relationship to partly widen the radial spacing 8 which extends in a circumferential direction between the raceways 1 and 3, at a part thereof as illustrated in FIG. 2. From the widened part of the spacing 8, the balls 5 are inserted between the inner raceway 1 and the outer raceway 3 as many as desired. Thereafter, the inner raceway 1 and the outer raceway 3 are rendered concentric with each other and the desired number of the balls 5 are disposed at equal angular intervals.

To rearrange the plural balls 5 which have been inserted together in the widened part of the spacing 8, at equal angular intervals as described above, it is necessary to make the individual balls 5 slide on and relative to the inner raceway 1 and the outer raceway 3. If the individual balls 5 are strongly pressed by the inner raceway 1 and the outer raceway 3, in other words, are in a preloaded state at this time, rolling surfaces of the inner raceway 1, outer raceway 3 and balls 5 are prone to damage. Their damage leads to such a problem such that vibrations may occur during rotation or the durability may be impaired.

In the case of the construction that a pair of single-row deep ball bearings are arranged at an interval as disclosed, for example, in Japanese Patent First Publication KOKAI No. S57-200722, on the other hand, each ball bearing is assembled in a state not applied with a preload so that this construction is free of such inconvenience as referred to above. However, the assembly work of the ball bearings is cumbersome.

Further, double-row, deep-groove ball bearings useful in tension pulleys or water pumps are disclosed, for example, in Japanese Patent First Publication KOKAI Nos. S61-65913 and S61-79899 and Japanese Utility Model First Publication KOKAI Nos. S50-101753 and S56-127456. These bearings are however not required to have very high rotational accuracy and are used in a state not applied with preload. They cannot therefore be used to support spindles in VTR, HDD or the like.

Japanese Patent First Publication KOKAI No. S61-145761 discloses a double-row angular ball bearing while Japanese Utility Model First Publication KOKAI No. S62-22323 discloses a double-row ball bearing constructed in combination of a deep-groove ball bearing and an angular ball bearing. To assemble an angular ball bearing, it is necessary to heat an outer race as disclosed, for example, in Japanese Utility Model Publication KOKOKU No. S39-3916 so that the outer race or ring is caused to expand by heating to protect shoulder portions of each raceway and/or rolling surfaces of balls when the balls pass along the shoulder portions. The assembly work is therefore irksome.

Japanese first Publication KOKAI No. S57-140912 discloses the invention in which a double-row, deep-groove ball bearing is equipped with an outer race or ring comprised of a main outer race and a subordinate outer race axially displaceable relative to the main outer race, and assembled in a state not applied with preload before the subordinate outer race is caused to displace axially to apply a predetermined preload and is then fixed by a retaining member. It also discloses the invention in which a predetermined preload is applied by axially pressing the subordinate outer race with a spring. The inventions disclosed in this patent publication, however, requires such a retaining member or spring. This results in more cumbersome management or control of parts and also in more irksome assembly work. Moreover, the ball bearing may require an unduly large axial length.

U.S. Pat. No. 4,900,958 discloses such constructions as shown in FIGS. 3 and 4, respectively. In the case of the construction depicted in FIG. 3, a pair of ball bearings 9 of the deep groove type (or of the angular type) are disposed between an outer peripheral face of a spindle or shaft 2 and an inner peripheral face of a housing 10, and the ball bearings 9 have their the inner races or rings 11a, 11b pushing in a direction approaching toward each other to apply a preload to balls 5 of both the ball bearings 9.

Specifically, an end face of the inner race or ring 11a located on the right-hand side as viewed in FIG. 3 is brought into abutment against a stop ring 12 and the inner race or ring 11b on the left-hand side as viewed in FIG. 3 is pushed toward the stop ring 12, whereby a preload is applied. The inner race or ring 11b is fixed on the spindle or shaft 2 by an adhesive or shrink fitting. It is therefore necessary to continuously push the inner race or ring 11b toward the stop ring 12 under a load equivalent to the preload until the adhesive solidifies or the inner race or ring 11b so heated shrinks.

In the case of the construction illustrated in FIG. 4, on the other hand, a pair of inner raceways 1 are formed in rows in an outer peripheral face of a spindle or shaft 2. A spacer 13 is arranged axially between a pair of outer races or rings 4 which are internally fitted in a housing 10. By the spacer 13, both the outer races or rings 4 are pushed in a direction moving away from each other so that a preload is applied to balls 5.

Further, Japanese Utility Model First Publication KOKAI No. H3-36517 discloses such a construction as shown in FIG. 5. By a leaf spring 14 held between a pair of outer races or rings 4, the outer races or rings 4 are both pushed in a direction moving away from each other so that a preload is applied to balls 5.

Japanese Patent First Publication KOKAI No. H3-222661 and U.S. Pat. No. 5,045,738 disclose such constructions as illustrated in FIGS. 6 and 7, respectively. In the construction of FIG. 6, a preload is applied by pushing with a leaf spring 14 an outer race or ring 4 internally fitted in a housing. In the construction of FIG. 7, on the other hand, an outer race or ring 4 is fixed on the housing 10 by an adhesive or shrink fitting while applying a predetermined preload. One of the outer raceways 3, in double-rows is formed in an inner peripheral face of the outer race or ring 4 while the other outer raceway 3 is formed in an inner peripheral face of the housing 10.

Although illustration by drawings is omitted, Japanese Patent First Publication KOKAI No. S61-145761 and U.S. Pat. No. 4,713,704 discloses such a construction that one of double-row inner raceways is formed in an outer peripheral face of a spindle or shaft, the other inner raceway is formed in an outer peripheral face of an inner race or ring externally fitted on the spindle or shaft, and the inner race or ring is adhered and fixed to the spindle or shaft with balls being applied with an appropriate preload.

The above-described constructions of FIGS. 3 to 7 and that disclosed in Japanese Patent First Publication KOKAI No. S61-145761 are accompanied not only by the problems that they require cumbersome assembly work and parts management or control as described above but also by the problem that they tend to develop small vibrations.

Specifically, in each of the above-described conventional constructions, each inner race or ring 11 or outer race or ring 4 tends to tilt upon preloading although the extent of the tilting may not be very large, because the inner race or ring 11 is loosely fitted on the spindle or shaft 2 in the case of the construction shown in FIG. 3 or the outer race or ring 4 is loosely fitted in the housing 10 in the case of the constructions illustrated in FIGS. 4 to 7, respectively. When tilted, the bearing so assembled produces small vibrations during rotation, leading to the potential problem that the performance of HDD or the like with the bearing assembled therein may be reduced.

The inventors of this application disclosed in Japanese Patent First Publication KOKAI No. H6-221326 a preloaded, double-row ball bearings as shown in FIGS. 8(A) through 12(B). A first example of the preloaded double-row ball bearings is produced in the steps as shown in FIG. 8(A) to FIG. 8(D). A spindle or shaft 15 has a small-diameter portion 15a and a large-diameter portion 15b which are connected at a stepped portion 15c as shown in FIG. 8(A). In an outer peripheral face of the large-diameter portion 15b, a first inner raceway 16 of the deep groove type is formed. An inner race or ring 17 has an inner diameter which is slightly smaller than an outer diameter of the small-diameter portion 15a in a free state. This inner race or ring 17 has a second inner raceway 18 of the deep groove type in an outer peripheral face thereof.

Upon manufacture of a rolling bearing having the spindle or shaft 15 and the inner race or ring 17, the inner race or ring 17 is, in a first step, externally fitted on the small-diameter portion 15a of the spindle or shaft 15 with sufficient strength of fitting (i.e., with strength sufficient to prevent any displacement of the inner race or ring 17 relative to the small-diameter portion 15a even under a reaction force produced upon application of a preload) as illustrated in FIG. 8(B). A pitch $P_1$ between the first inner raceway 16 in the outer peripheral face of the large-diameter portion 15b and the second inner raceway 18 in the outer peripheral face of the inner race or ring 17 is set longer than a pitch $p_1$ (FIG. 8(D)) required to apply a predetermined preload to the rolling bearing after its completion (i.e., $P_1 > p_1$).

As a second step, the spindle or shaft 15 and the inner race or ring 17 assembled together in the first step is next inserted inside a cylindrical outer race or ring 19. A pair of deep groove type outer raceways 25 are formed in an inner peripheral face of the outer race or ring 19. The paired outer raceways 25 are positioned opposite the first inner raceway 16 and second inner raceway 18 respectively.

In a third step, the spindle or shaft 15 and the inner race or ring 17 are next made eccentric with the outer race or ring 19 so that, as illustrated in FIG. 2 described above, the radial spacings 8 extending in a circumferential direction between the paired outer raceways 25 and the first and second inner raceways 16, 18 are partly widened. Through the widened parts of the spacings 8, balls 5 ere inserted into the respective spacings 8 as many as desired.

In a fourth step, the spindle or shaft 15 and the inner race or ring 17 are then brought into a concentric relationship with the outer race or ring 19 while moving, in a circumferential direction, the desired numbers of balls 5 inserted in the respective spacings 8 between the paired outer raceways 25 and the first and second inner raceways 16, 18, whereby the balls 5 are arranged circumferentially at equal intervals.

In addition, the retainers 6 are disposed on the respective rows of balls as illustrated in FIG. 8(C), so that the balls 5 are held circumferentially at equal intervals.

Seals 7 can also be arranged, as needed, on the inner peripheral face of the outer race or ring 19 at opposite end portions thereof. At this point, no preload has yet been applied to the individual balls 5.

In a fifth step, the inner race or ring 17 is finally displaced axially (i.e., leftwards as viewed in FIG. 8(D)) on the outer peripheral face of the spindle or shaft 15 toward the stepped portion 15c, whereby the pitch between the first inner raceway 16 and the second inner raceway 18 is shortened to the pitch $p_1$ which is required to apply the predetermined preload. At this point, the balls 5 have been applied with the predetermined preload so that the bearing is completed as a preloaded rolling bearing. Even at the time of completion of the assembly, there is a clearance between the stepped portion 15c and the end face of the inner race 17 closer to the stepped portion 15c.

In the preloaded rolling bearing obtained as described above, a holding force greater than an axial load corresponding to the preload occurs based on a frictional force of the interference fitting between the inner peripheral face of the inner race or ring 17 and the outer peripheral face of the small-diameter portion 15a. Consequently, without coating an adhesive between the spindle or shaft 15 and the inner race or ring 17, the inner race or ring 17 is not dislocated and the preload so applied is not lost. The assembly so completed can therefore be handled as an integral ball bearing. This can hence facilitate the work which is required to construct a bearing portion for a spindle in VTR or HDD. Owing to the preload applied in the axial direction, the rotatable support of the spindle can be achieved with high accuracy.

The inner race or ring 17 can however be displaced relative to the small-diameter portion 15a by axially applying a force greater than the holding force produced by the interference fitting. It is therefore possible to subsequently adjust, namely, either increase or decrease the preload applied to the rolling bearing provided that a suitable force greater than the load mentioned above is applied to the inner race or ring 17 to have the inner race or ring 17 displaced in an axial direction.

Next, FIGS. 9(A) through 9(E) illustrate the second example, where first inner raceway 16a and second inner raceway 18a are respectively formed in the outer peripheral faces of the spindle or shaft 15 and of an inner race or ring 17a subsequent to external fitting of the inner race or ring 17a on the small-diameter portion 15a as depicted in FIGS. 9(A) through 9(C) in this embodiment.

By adopting such a construction, upon the external fitting of the inner race or ring 17a on the small-diameter portion 15a, the inner raceway 18a is prevented from being deformed or distorted into a non-circular shape. The second inner raceway 18 (see FIGS. 9(A) through 9(D)) may be deformed or distorted upon the external fitting.

Reference is next made to FIGS. 10(A) through 10(E) which illustrates the third example. As is depicted in FIG. 10(A), formed in an inner peripheral face of a main outer race or ring 20 are a smaller diameter portion 20a, a larger diameter portion 20b, and a stepped potion 20c connecting the portions 20a and 20b together. A subordinate outer race or ring 21 is internally fittable in the large-diameter portion 20b. In an inner peripheral face of the subordinate outer race 21 and an inner peripheral face of the small-diameter portion 20a, grooves 22a, 22b having an arcuate cross-section are formed over the entire circumferences thereof, respectively. Further, the subordinate outer race 21 has an outer diameter which is somewhat greater in a free state than the inner diameter of the large-diameter portion 20b.

To manufacture a preloaded rolling bearing by using the main outer race or ring 20 and the subordinate outer race or ring 21, in a first step, the subordinate outer race or ring 21 is first fitted internally in the large-diameter portion 20b with sufficient strength of fitting as illustrated in FIG. 10(B), and a first outer raceway 23 and a second outer raceway 24 are formed in the grooves 22a, 22b, respectively, as shown in FIG. 10(C).

As has been described above, the first outer raceway 23 and second outer raceways 24 are formed after the main outer race or ring 20 and the subordinate outer race or ring 21 have been assembled. The roundness of these outer raceways 23, 24 can therefore be improved to a high level of accuracy and, moreover, the eccentricity between the outer raceways 23, 24 and the outer peripheral face of the main outer race 20 can be minimized. Incidentally, the pitch $P_2$ between the first outer raceway 23 and the second outer raceway 24 formed as described above should be set longer than a pitch $p_2$ (see FIG. 10(E)) which is required to apply a predetermined preload ($P_2 > p_2$).

In a second step, a spindle or shaft 2 with a pair of inner raceways 1 formed in an outer peripheral face thereof (see FIG. 10(D)) is next inserted inside the main outer race or ring 20 and the subordinate outer race or ring 21 assembled together in the first step, whereby the paired inner raceways 1 are positioned opposite the first and second outer raceways 23, 24, respectively.

In a third step, a illustrated in FIG. 2, the main outer race or ring 20 and subordinate outer race or ring 21 are then made eccentric relative to the spindle or shaft 2, and balls 5 are inserted, as many as needed, in the spacings between the paired inner raceways 1 and the first and second outer raceways 23, 24, respectively.

In a fourth step, as shown in FIG. 10(D), the outer main race 20 and subordinate outer race 21 are next made concentric relative to the spindle or shaft 2, and the balls 5 inserted between the paired inner raceways 1 and the first and second outer raceways 23, 24 are arranged circumferentially at equal intervals. In this fourth step, retainers 6 are attached to the balls 5 arranged at equal intervals.

In a fifth step, the subordinate outer race or ring 21 is finally displaced in an axial direction, that is, in a leftward direction as viewed in FIG. 10(D), along the inner peripheral face of the main outer race or ring 20 so that, as is depicted in FIG. 10(E), the pitch between the first outer raceway 23 and the second outer raceway 24 is shortened to the pitch $p_2$ required to apply a predetermined preload. At this point, the predetermined preload is applied to the balls 5. Seals 7, 7a are then attached as in FIG. 10(E) so that a rolling bearing is completed.

As in the fourth example shown in FIGS. 11(A) and 11(B), a pair of subordinate outer race or rings 21, 21a can be internally fitted in a main outer race or ring 20A, which itself does not have any outer raceway.

In the construction of FIGS. 11(A) and 11(B), a pair of inner raceways 1 are formed on the outer peripheral face of the inner ring or race 17c.

FIG. 12(A) and FIG. 12(B) show a fifth example where the preload is adjusted by changing the pitch of the first and second inner raceways. In this case, a pair of inner races or rings 17, 17b, can be fitted onto the spindle or shaft 2 with the first and second inner raceways 16b, 18b formed on the outer peripheral faces of the inner ring or races 17, 17b.

The preloaded double-row ball bearing disclosed as in Japanese Patent First Publication KOKAI No. H6-221326 and constructed and operating as mentioned above have however still the following problems to be solved.

The preloaded double-row ball bearings are not necessarily preloaded when they are installed for example in an electric motor which is a driving source of HDD etc. There is a case, for example, where a double-row ball bearing is discharged without preloading from a bearing factory, and installed in an electric motor in a motor assembling factory before the balls 5 in rows are preloaded by axial displacement of the inner rings or races 17, 17a 17b (FIGS. 8(A) to 8(E), 9(A) to 9(E), 12(A) and 12(B)) or of the subordinate outer rings or races 21, 21a (FIGS. 10(A) to 10(E), 11(A) and 11(B)).

On the other hand, if the precise ball bearings to be installed in the HDD etc. have even small flaws in the surfaces of the raceways and/or balls, that is in the raceway surface and/or rolling surfaces, the equipment such as HDD having such ball bearings installed in it is worsened in performance due to vibrations caused by rotation.

Accordingly, the ball bearings to be installed in the precise equipment such as the HDD etc. are individually examined for flaws on the raceways and rolling surfaces before installation. In order to examine the flaws, the spindle or shaft 15, 2 and the outer ring or race 19 (or main outer rings or races 20, 20A and subordinate outer rings or races 21, 21a) are rotated relative to each other to measure the acoustic sound caused by rotation. The flaws on these surfaces would produce peaks in the acoustic sound level.

However, in the double-row ball bearings which are not preloaded, the contact conditions between the raceway and the rolling surfaces of balls are different from the contact conditions in use, that is when preloaded. Therefore, they are not precisely examined.

In addition, the rolling surfaces of the balls come into rolling contact only with the specific areas of the raceways when preloaded, while the rolling surfaces of the balls do not necessarily come into rolling contact with the same specific areas of the raceways when not preloaded.

It should be noted that in spite of the fact that there are flaws on the specific areas of the raceways, they are not detected unless the rolling surfaces of the balls come into contact with the specific areas of the raceways when examined.

The ball bearings which have passed through the examination with the existence of flaws not found, are installed in a motor, and preloaded before the following rotation test.

The motor is examined in the rotation test, and if the flaws in the ball bearing are found in this test, the whole motor including the ball bearings must be rejected as a defective product.

It is economically undesirable to reject the whole motor simply because of the flaws in the ball bearing.

SUMMARY OF THE INVENTION

The present invention provides a preloaded double-row ball bearing taking into consideration the problems as mentioned above.

An object of the present invention is to provide a double-row ball bearing comprising:

a first member having a first peripheral face, a second member disposed concentric with the first member and having a second peripheral face opposed to the first peripheral face, the first peripheral face having a first raceway formed thereon, the second peripheral face having a second raceway formed thereon so as to face to the first raceway and a third raceway formed thereon and axially displaced from the second raceway, a third member supported by the first member with a sufficient fitting strength and provided concentric with the first and second members and having a third peripheral face opposed to the second peripheral face, the third peripheral face having a fourth raceway formed thereon so as to face to the third raceway, and a plurality of balls provided between the first raceway and the second raceway, and between the third raceway and the fourth raceway, wherein there are a first pitch corresponding to the space between the first raceway and the fourth raceway, and a second pitch corresponding to the space between the second raceway and the third raceway, so that the first pitch and the second pitch are controlled so as not to preload the balls.

An another object of the present invention is to provide a method of producing a double row ball bearing:

by assembling a first member provided with a first peripheral face so as to form a first raceway on the first peripheral face, a second member provided with a second peripheral face opposed to the first peripheral face so as to form on the second peripheral face, second and third raceways which are axially displaced from each other, and a third member provided with a third peripheral face opposed to the second peripheral face so as to form a fourth raceway on the third peripheral face, such that the third member is supported by the first member with a sufficient fitting strength, wherein the first raceway is faced to the second raceway while the third raceway is faced to the fourth raceway, and by inserting balls between the first and second raceways, and between the third and fourth raceways, wherein there are a first pitch corresponding to the space between the first raceway and the fourth raceway, and a second pitch corresponding to the space between the second raceway and the third raceway, so that the first pitch and the second pitch are controlled so as not to preload the balls.

In the state where the balls are not preloaded, while axially opposite forces are alternatively applied to the first member and the third member relative to the second member, the first member and the third member are rotated relative to the second member, whereby acoustic sound produced by rotation is measured to examine the existence of flaws on the surfaces of the raceways and balls. After examination, the third member is axially displaced with reference to the first member, so that the relationship between the first pitch and second pitch is changed for preloading the balls by a predetermined amount.

DETAILED DESCRIPTION OF THE PREFERRED EMBODIMENTS

Now, some embodiments of the present invention are explained corresponding to the drawings.

Figure 1:
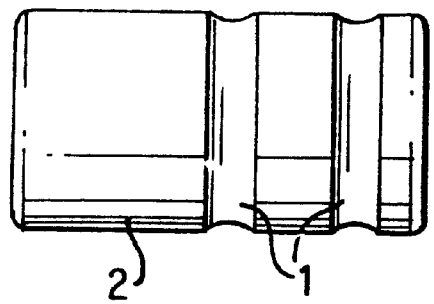
FIG. 1(A) is a side view of a shaft for use in a prior art ball bearing.
FIG. 1(B) is a cross sectional view of an outer ring of the prior art ball bearing.
FIG. 1(C) is a cross sectional view of the prior art ball bearing comprising the shaft of FIG. 1(A) and the outer ring of FIG. 1(B).
Figure 1:
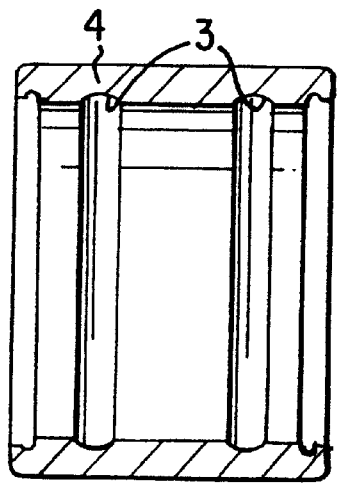
Figure 1:
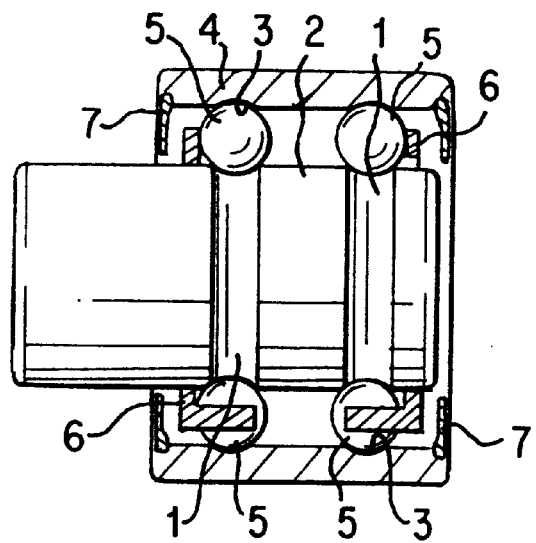
Figure 2:
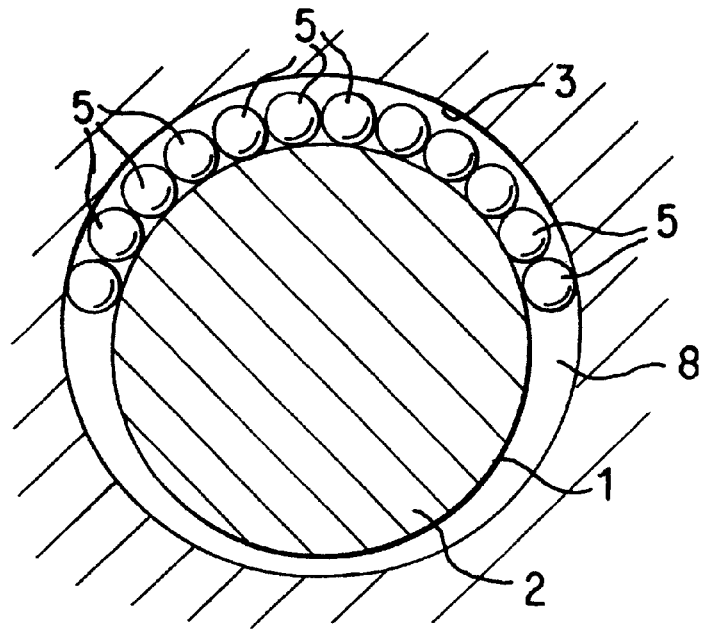
FIG. 2 is a cross sectional view showing the outer and inner raceways which are made eccentric so that the balls can be insert between them.
Figure 3:
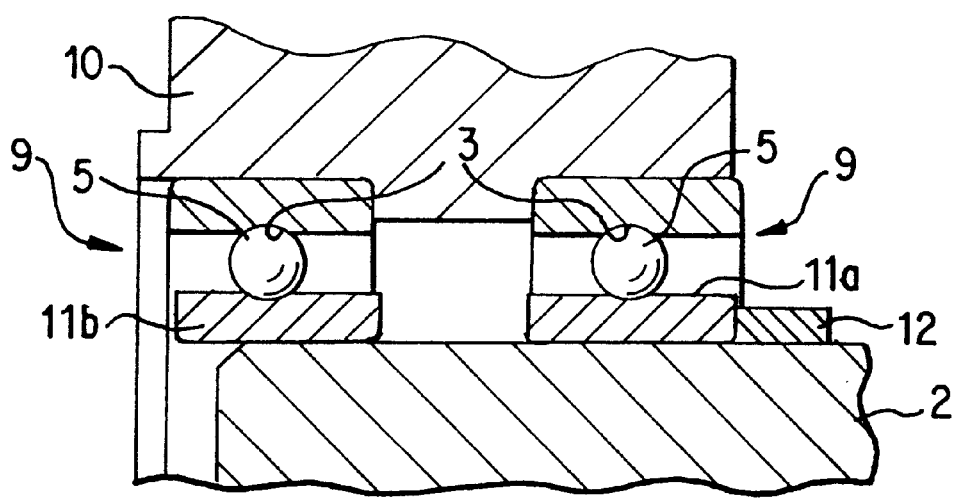
FIG. 3 is a cross sectional half view showing an example of the prior art constructions.
Figure 4:
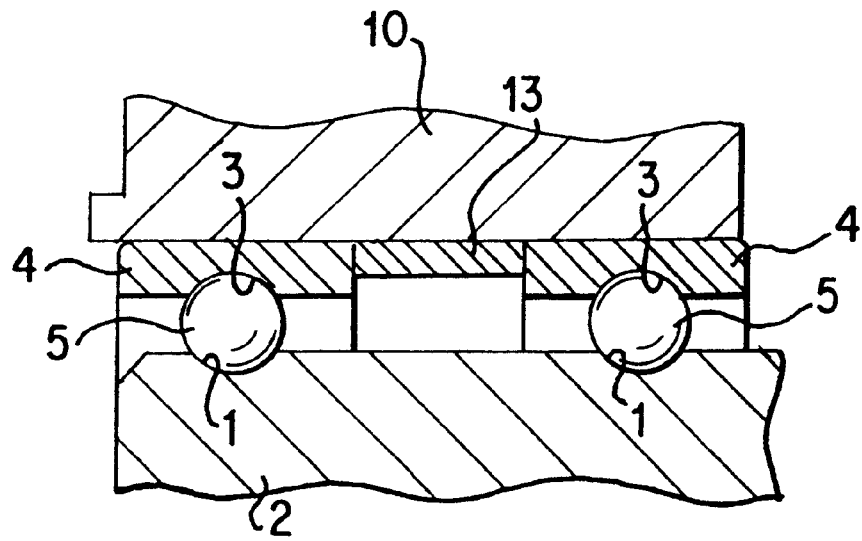
FIG. 4 is a cross sectional half view showing a second example of the prior art constructions.
Figure 5:
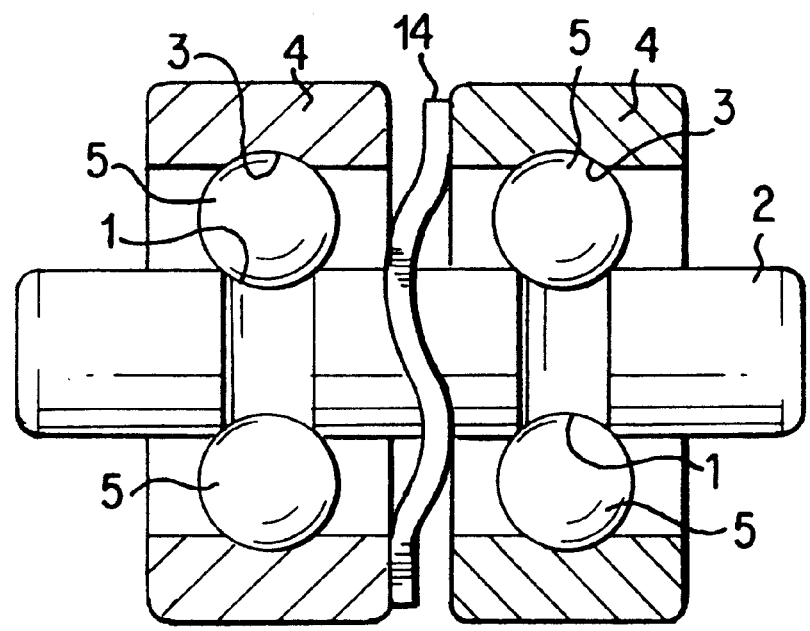
FIG. 5 is a cross sectional view showing a third example of the prior art constructions.
Figure 6:
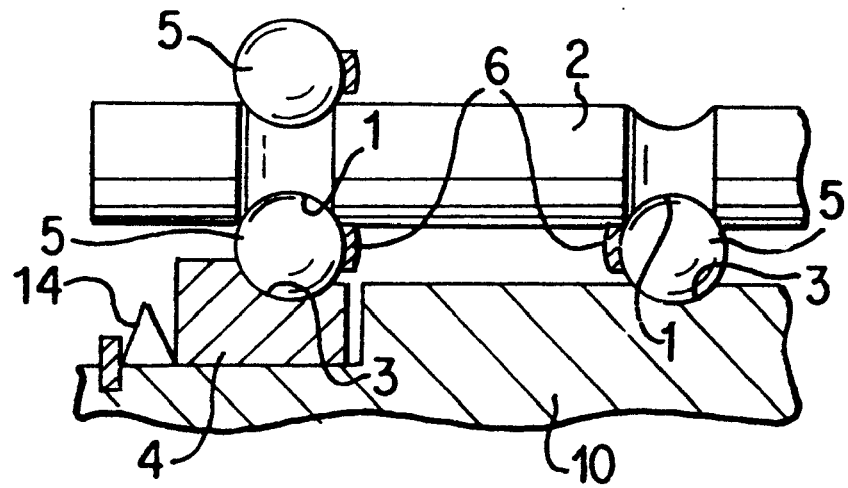
FIG. 6 is a cross sectional half view showing a fourth example of the prior art constructions.
Figure 7:
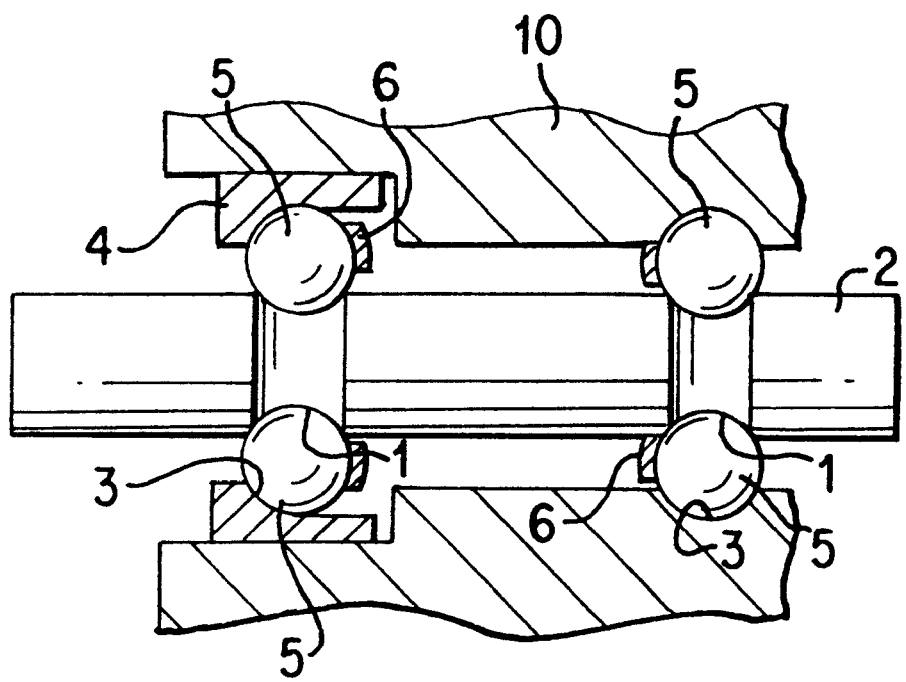
FIG. 7 is a cross sectional view showing a fifth example of the prior art constructions.
Figure 8:
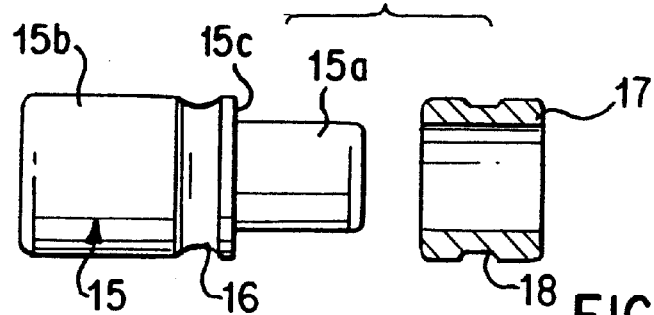
FIG. 8(A) to FIG. 8(D) are cross-sectional views to show the steps where a prior art preloaded double row ball bearing is assembled.
Figure 8:
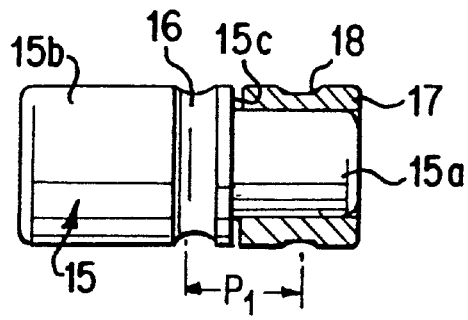
Figure 8:
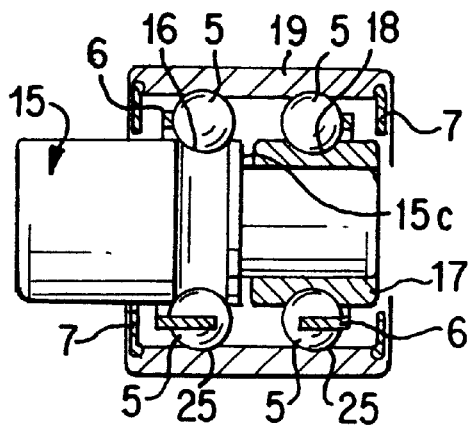
Figure 8:
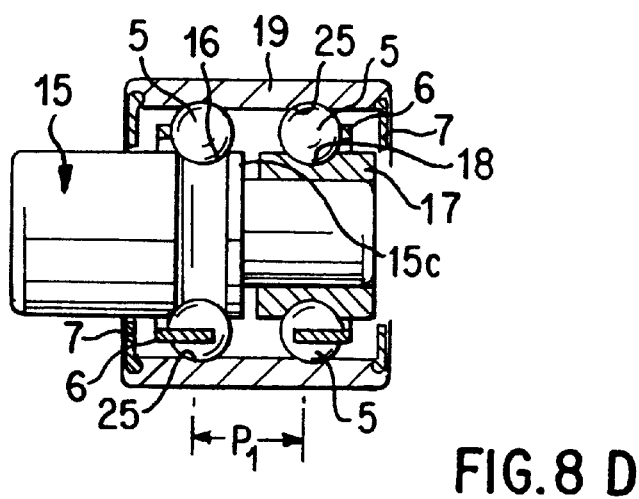
Figure 9:
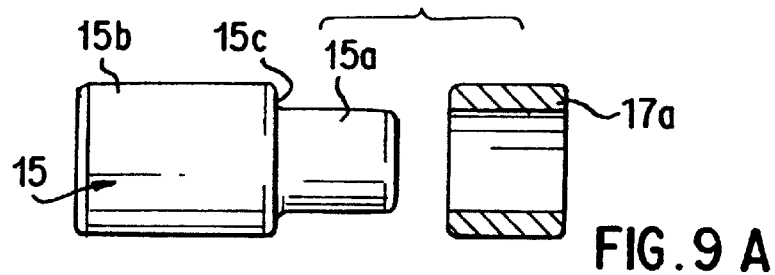
FIG. 9(A) to FIG. 9(E) are cross sectional views to show the steps where another prior art preloaded double row ball bearing is assembled.
Figure 9:
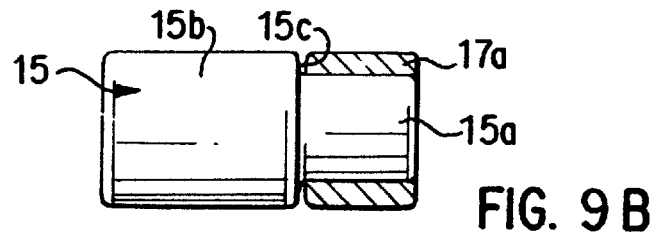
Figure 9:
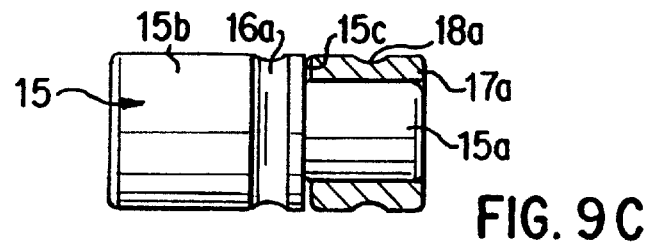
Figure 9:
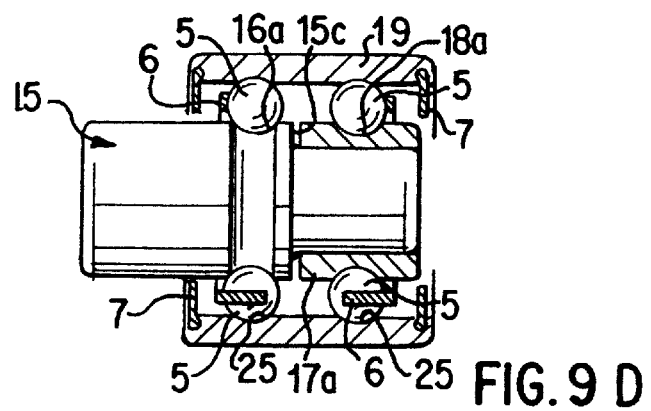
Figure 9:
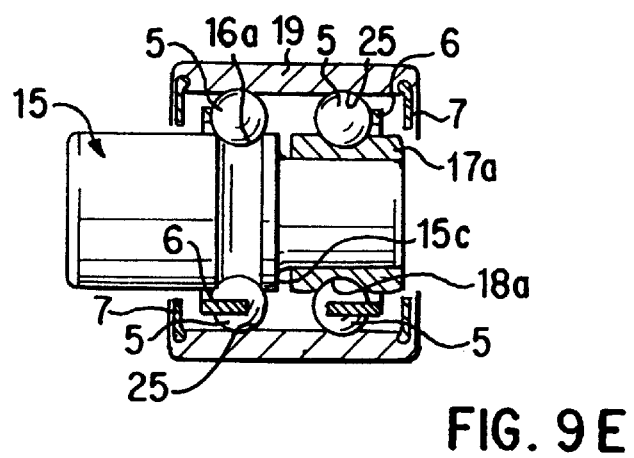
Figure 10:
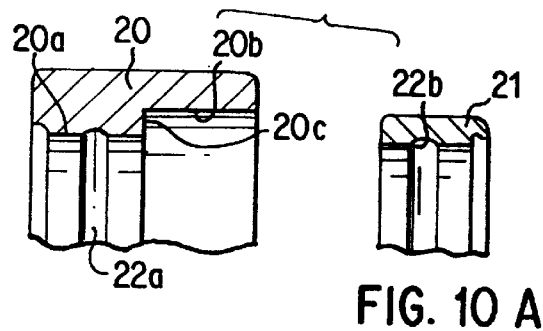
FIG. 10(A) to FIG. 10(E) are cross sectional views to show the steps where another prior art preloaded double row ball bearing is assembled.
Figure 10:
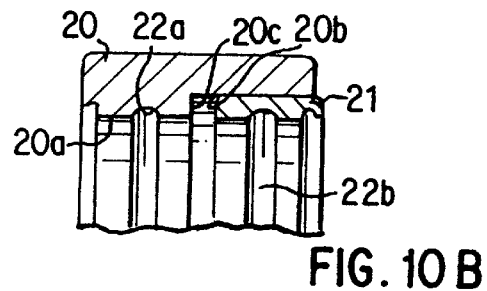
Figure 10:
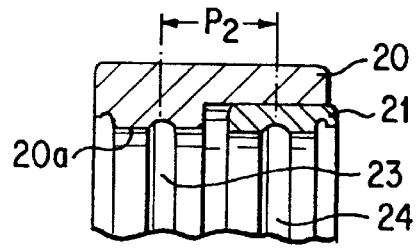
Figure 10:
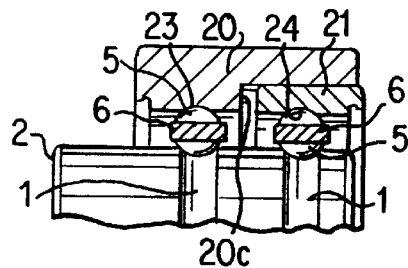
Figure 10:
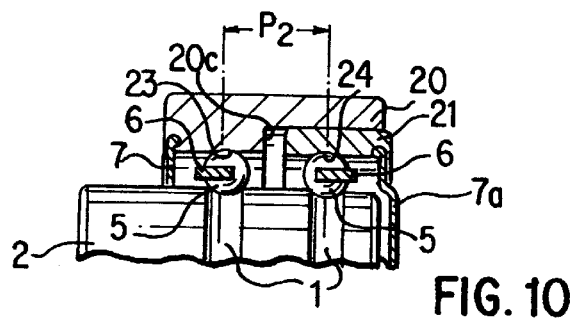
Figure 11:
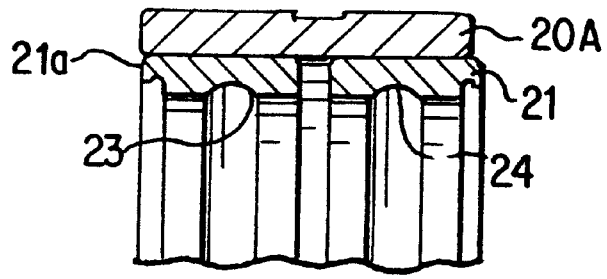
FIG. 11(A) and FIG. 11(B) are cross sectional half views to show the steps where another prior art preloaded double row ball bearing is assembled.
Figure 11:
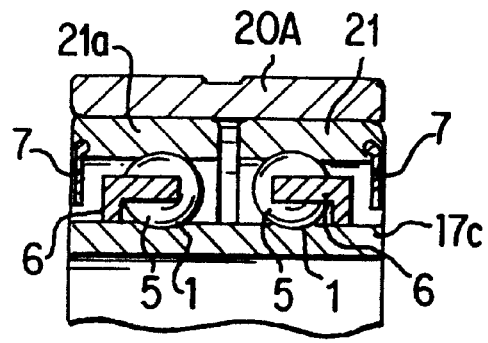
Figure 12:
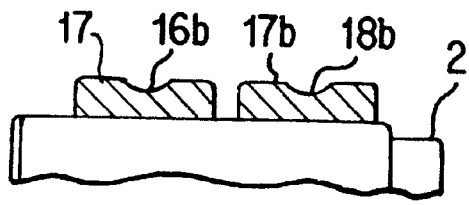
FIG. 12(A) and FIG. 12(B) are cross sectional half views to show the steps where another prior art preloaded double row ball bearing is assembled.
Figure 12:
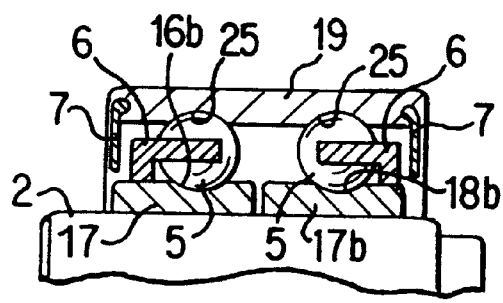

FIG. 13 to FIG. 16 show an embodiment of the present invention. Specifically, the present invention in this embodiment is applied to the construction of FIGS. 12(A), 12(B). The present invention can also be applied to the constructions as shown in FIG. 8(A) to FIG. 11(B).

Figure 13:
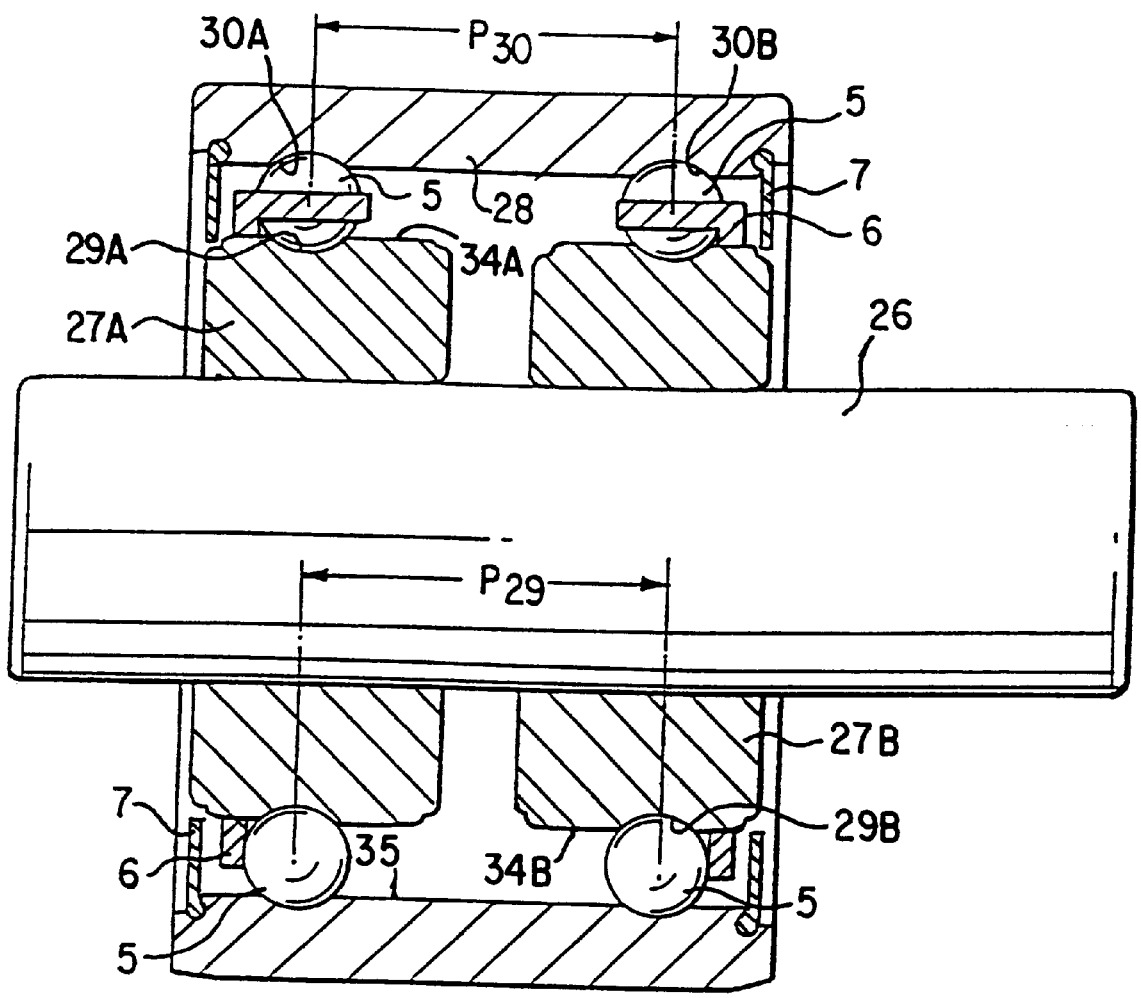
FIG. 13 is a cross sectional view of an embodiment of the ball bearing according to the present invention.

In FIG. 13, the shaft 26 has an outer peripheral face on which a pair of inner rings or races 27A, 27B are fitted with a sufficient fitting strength, so that the inner rings or races 27A, 27B are not moved by the reaction force based on the preloading.

A cylindrical outer ring or race 28 is provided around the inner rings or races 27A, 27B and concentric with the shaft 26 and the inner rings or races 27A, 27B.

The inner rings or races 27A, 27B are each provided with an inner raceway 29A, 29B of the deep groove type on their outer peripheral faces 34A, 34B respectively.

The outer ring or race 28 is provided with an outer raceway 30A, 30B of the deep groove type at either axial end on its inner peripheral face 35. The term "axial" means the left-right direction in FIG. 13.

In FIG. 13, the shaft 26, and one of the inner rings or races 27A fitted onto the shaft 26 may be referred to as a first member, the outer ring or race 28 may be referred to as a second member, and the other of the inner rings or races 27B may be referred to as a third member.

The inner raceway 29A on the inner ring 27A may be referred as the first raceway, and the outer raceways 30A opposed to the inner raceway or first raceway 29A, the other of the outer raceways 30B, the inner raceway 29B on the outer peripheral face other of the inner ring 27B may be referred to as the second, third and fourth raceways, respectively.

A plurality of balls 5 are rotatably provided between the inner raceways 29A, 29B and the outer raceways 30A, 30B respectively, and located circumferentially at a uniform space by a retainer or cage 6, respectively.

A seal 7 is provided at either opening section of the outer ring or race 28.

The pitch $P_{29}$ of the inner raceways 29A, 29B is larger than the pitch $p_{29}$ with which the balls 5 in each row are preloaded ($P_{29} > p_{29}$).

Specifically, the pitch $p_{29}$ for preloading must be sufficiently smaller than the pitch $P_{30}$ of the outer raceways 30A, 30B ($p_{29} << P_{30}$). Practically, ($P_{30} - p_{29}$) < 1 mm.

On the other hand, the pitch $P_{29}$ in the condition where the existence of flaws is examined before installation into the motor etc. is equal to or slightly smaller than the pitch $P_{30}$ of the outer raceways 30A, 30B ($P_{29} \leq P_{30}$).

Figure 14:
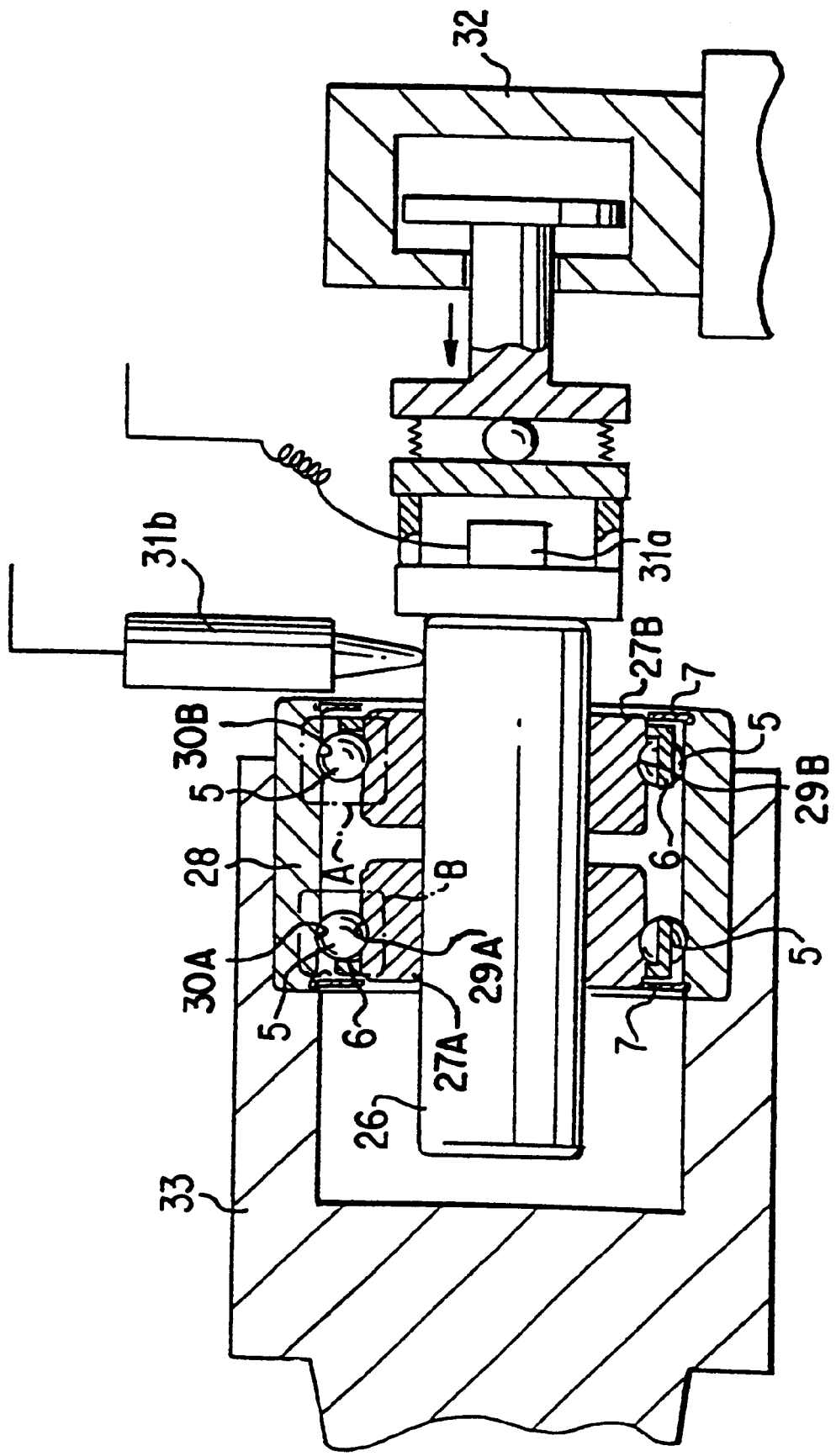
FIG. 14 is a cross sectional view of the ball bearing of FIG. 13 which is set in the inspection apparatus to examine flaws.
Figure 15:
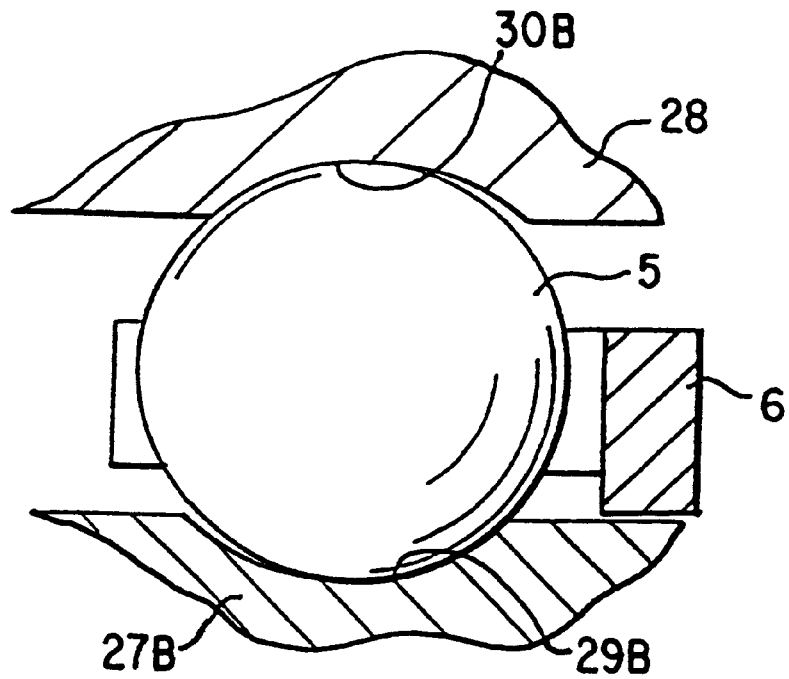
FIG. 15(A) is an enlarged cross sectional view of the portion A of the ball bearing in FIG. 14 in the first inspection step.
FIG. 15(B) is an enlarged cross section view of the portion B of the ball bearing in FIG. 14 in the first inspection step.
Figure 15:
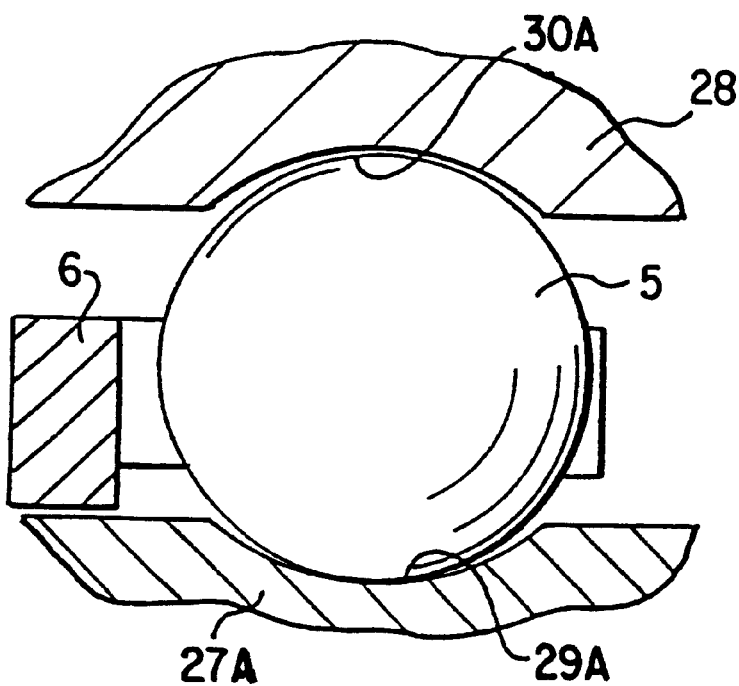
Figure 16:
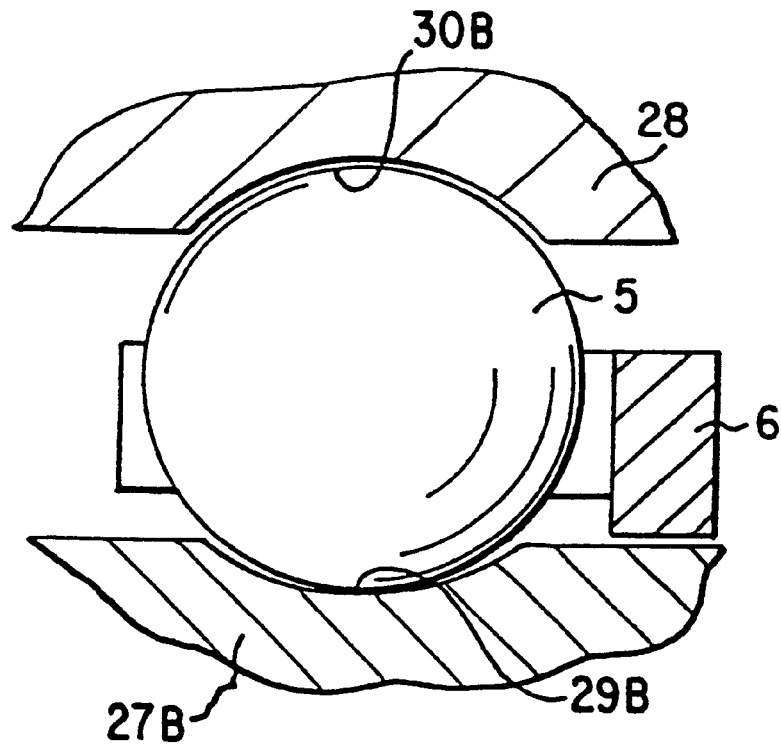
FIG. 16(A) is an enlarged cross sectional view of the portion A of the ball bearing in FIG. 14 in the second inspection step.
FIG. 16(B) is an enlarged cross sectional view of the portion B of the ball bearing in FIG. 14 in the second inspection step.
Figure 16:
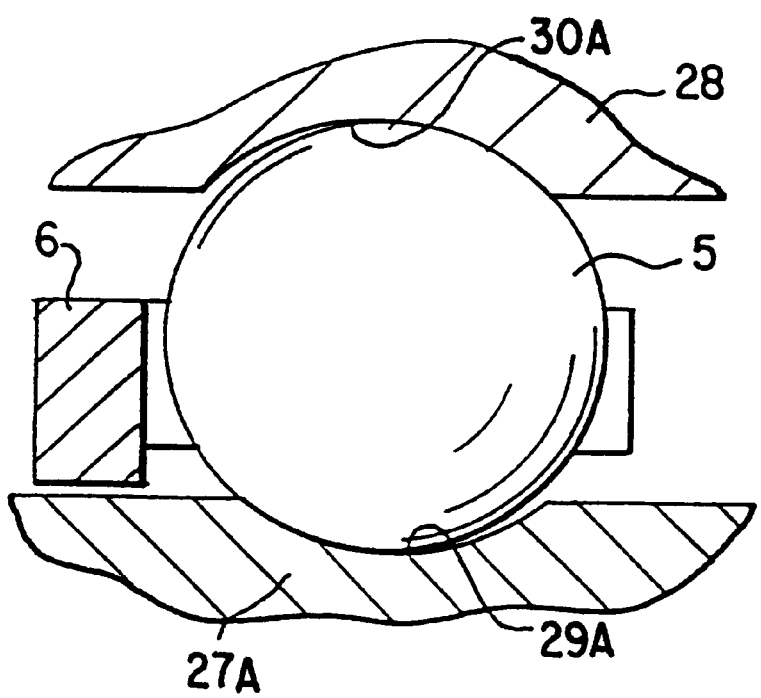

The double row ball bearing assembled in this way is set in an inspection apparatus as shown in FIG. 14 to check whether any flaws exist in the inner raceways 29A, 29B, outer raceways 30A, 30B and the rolling surfaces of the balls 5.

This inspection apparatus is disclosed in Japanese Patent First Publication KOKAI No. H5-10835. The shaft 26 is stationary and the outer ring or race 28 is rotatable. The acoustic sound produced as the outer ring or race 28 is rotated is detected by a vibration pickups 31a, 31b which output detection signals. The flaw inspection is carried out based on the detection signals from the vibration pickups 31a, 31b.

The shaft 26 is axially pressed by a preload cylinder 32 during inspection to preload each of the balls 5 in the row on the side of pressing face (right in FIG. 14). This preload is equal in strength to the preload applied during use (during installation in the motor etc.).

In this condition, the holder 33 holding the outer ring or race 28 is rotated to detect the acoustic sound produced by the vibration pickups 31a, 31b.

When the shaft 26 is pressed in the double row ball bearing which is not preloaded, the balls 5 in the row on the side of pressing face (right in FIG. 14) come into rolling contact with the inner and outer raceways 29B, 30B at a predetermined contact angle is in FIG. 15(A). This contact angle is substantially the same as that during use.

On the other hand, a clearance is provided between the balls 5 in the row on the other side opposite to the pressing face (left in FIG. 14) and the inner and outer raceways 29A, 30A as shown in FIG. 15(B).

In this condition, the outer ring or race 28 is rotated, and the vibrations caused by rotation of the outer race or ring 28 caused by rotation are detected by the pickups 31a, 31b, so that any flaws in the inner raceway 29B, outer raceways 30B and the rolling surfaces of balls 5 on the side of the pressing face can be detected.

When it is assured that any flaws exist through the inspection, the double row ball bearing under the inspection is rejected. On the contrary, if no flaw is detected, the shaft 26 is forced rearwards for the next similar inspection.

Specifically, as the shaft 26 is forced rearwards, the balls 5 on the other side (left in FIG. 14) come into rolling contact with the inner and outer raceways 29, 30, so that inspection of flaws is possible in the areas not inspected. Practically, the outer race or ring 28 of the double row ball bearing is withdrawn from the holder 33, and the direction of the double row ball bearing is changed by 180 degrees. Then, the outer ring or race 28 is again assembled in the holder 33 for the inspection on the other side. Only the double row ball bearings with no flaws detected are then discharged to the motor assembling factories etc.

In the motor assembling factories etc., the double row ball bearings experienced the inspection as mentioned above are installed into motors, and then one or both of the inner rings or races 27A, 27B is axially displaced to make the inner rings or races 27A, 27B in pair closer to each other, so that the pitch of the inner raceways 29A, 29B on the outer peripheral faces of the inner rings or races 27A, 27B becomes equal to the pitch $p_{29}$.

According to the present invention on the double row ball bearing and the producing method for the same, it is prevented that defective parts are erroneously installed in the double row ball bearings within various devices to decrease the yield of the devices with the double row ball bearings.

Specifically, according to the present invention for producing a double row ball bearing, the existence of flaws on the raceways and/or on the ball surfaces can be examined before preloading the balls. Accordingly it is prevented that any defective ball bearings are erroneously installed in the motor etc.

What is claimed is:

1. A method of producing a double row ball bearing comprising:

(A) assembling:

a first member having a first peripheral face with a first raceway formed on the first peripheral face, a second member having a second peripheral face and disposed such that said second peripheral face is opposed to the first peripheral face with second and third raceways formed on the second peripheral face and axially displaced from each other, and a third member having a third peripheral face and disposed such that said third peripheral face is opposed to the second peripheral face with a fourth raceway formed on the third peripheral face, such that the third member is supported by the first member with a sufficient fitting strength, wherein the first raceway faces the second raceway while the third raceway faces the fourth raceway, (B) inserting balls between the first and second raceways, and between the third and fourth raceways such that the first, second, and third members are concentric with each other, wherein there are a first pitch corresponding to a distance between the first raceway and the fourth raceway, and a second pitch corresponding to a distance between the second raceway and the third raceway, so that the first pitch and the second pitch are controlled so as not to preload the balls, (C) applying a force axially in one direction to the first member and the third member relative to the second member in the state where the balls are not preloaded, so that the first member and the third member are rotated relative to the second member, (D) measuring acoustic sound produced by rotation to examine the existence of flaws on the surfaces of the third and fourth raceways and the balls, (E) applying a force axially in the other direction to the first member and the third member relative to the second member in the state where the balls are not preloaded, so that the first member and the third member are rotated relative to the second member, (F) measuring acoustic sound produced by rotation to examine the existence of flaws on the surfaces of the first and second raceways and the balls, and (G) axially displacing the third member with reference to the first member, so that a relationship between the first pitch and second pitch is changed for preloading the balls by a predetermined amount.

2. The method of claim 1, wherein the first member is formed by a shaft and a first inner ring fitted thereon, the second member is formed by an outer ring, and the third member is formed by a second inner ring juxtaposed to the first inner ring.

3. A method of producing a double row ball bearing, comprising:

assembling first, second, and third members, said first member having a first peripheral face defining a first raceway, said second member having a second peripheral face defining second and third raceways spaced axially at a first raceway pitch, and said third member having a third peripheral face defining a fourth raceway, said first, second, and third members being assembled such that said third member is supported on said first member by a frictional force therebetween which is at least as great as a predetermined preload to be applied to said bearing, such that said first raceway faces said second raceway and said third raceway faces said fourth raceway, and such that said first raceway is spaced axially from said fourth raceway at a second raceway pitch which is less than said first raceway pitch;

inserting a plurality of balls between said first and second raceways, and between said third and fourth raceways;

rotating said second member relative to said first and third members while applying a force in a first axial direction to said second member relative to said first and third members such that a preload corresponding to said predetermined preload is applied to said balls located between said third and fourth raceways, while essentially no load is applied to said balls located between said first and second raceways; and measuring acoustic sound produced during said rotating step to determine whether a flaw exists on a surface of said third raceway, said fourth raceway, or said balls located therebetween.

4. A method according to claim 3, further comprising the steps of:

rotating said second member relative to said first and third members while applying a force in a second axial direction to said second member relative to said first and third members, such that a preload corresponding to said predetermined preload is applied to said balls located between said first and second raceways, while essentially no load is applied to said balls located between said third and fourth raceways; and measuring acoustic sound produced during said rotating step to determine whether a flaw exists on a surface of said first raceway, said second raceway, or said balls located therebetween.

5. A method according to claim 4, further comprising the step of axially displacing said third member relative to said first member to reduce said second raceway pitch, such that said predetermined preload is applied to said balls.

6. A method according to claim 5, wherein said first member comprises a shaft and a first inner ring fitted thereon, said second member comprises an outer ring, and said third member comprises a second inner ring fitted on said shaft axially adjacent said first inner ring.

7. A method according to claim 4, wherein said first member comprises a shaft and a first inner ring fitted thereon, said second member comprises an outer ring, and said third member comprises a second inner ring fitted on said shaft axially adjacent said first inner ring.

8. A method according to claim 3, further comprising the step of axially displacing said third member relative to said first member to reduce said second raceway pitch, such that said predetermined preload is applied to said balls.

9. A method according to claim 8, wherein said first member comprises a shaft and a first inner ring fitted thereon, said second member comprises an outer ring, and said third member comprises a second inner ring fitted on said shaft axially adjacent said first inner ring.

10. A method according to claim 3, wherein said first member comprises a shaft and a first inner ring fitted thereon, said second member comprises an outer ring, and said third member comprises a second inner ring fitted on said shaft axially adjacent said first inner ring.

* * * * *